United States Patent
Nakamura

(10) Patent No.: US 8,873,361 B2
(45) Date of Patent: Oct. 28, 2014

(54) OPTICAL INFORMATION RECORDING/REPRODUCING APPARATUS AND METHOD

(71) Applicant: Hitachi Consumer Electronics Co., Ltd., Tokyo (JP)

(72) Inventor: Yusuke Nakamura, Ebina (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/874,551

(22) Filed: May 1, 2013

(65) Prior Publication Data

US 2013/0343171 A1    Dec. 26, 2013

(30) Foreign Application Priority Data

Jun. 20, 2012    (JP) .................................. 2012-138314

(51) Int. Cl.
| | |
|---|---|
| G11B 7/00 | (2006.01) |
| G11B 7/1392 | (2012.01) |
| G11B 7/1369 | (2012.01) |
| G11B 7/128 | (2012.01) |
| G11B 7/0065 | (2006.01) |
| G11B 7/007 | (2006.01) |

(52) U.S. Cl.
CPC .......... *G11B 7/0065* (2013.01); *G11B 7/00772* (2013.01); *G11B 7/13925* (2013.01); *G11B 7/1369* (2013.01); *G11B 7/128* (2013.01)
USPC ............................................ 369/103; 359/32

(58) Field of Classification Search
None
See application file for complete search history.

(56) References Cited

U.S. PATENT DOCUMENTS

| | | | |
|---|---|---|---|
| 2006/0238841 A1 | 10/2006 | Anderson et al. | |
| 2008/0067321 A1* | 3/2008 | Miyamoto et al. | 250/201.5 |
| 2008/0198432 A1* | 8/2008 | Tanaka et al. | 359/32 |
| 2009/0161519 A1* | 6/2009 | Yamamoto et al. | 369/103 |
| 2011/0273754 A1* | 11/2011 | Shimada et al. | 359/11 |
| 2012/0026856 A1 | 2/2012 | Shimada et al. | |
| 2013/0128714 A1* | 5/2013 | Nakamura et al. | 369/103 |

FOREIGN PATENT DOCUMENTS

| | | |
|---|---|---|
| JP | 2004-272268 | 9/2004 |
| JP | 2007294051 A * | 11/2007 |
| JP | 2012-27996 | 2/2012 |

* cited by examiner

*Primary Examiner* — Brenda Bernardi
(74) *Attorney, Agent, or Firm* — Antonelli, Terry, Stout & Kraus, LLP.

(57) ABSTRACT

There is disclosed an optical information recording/reproducing apparatus for optically recording and/or reproducing information in and from an optical recording medium. The apparatus has an oscillator light generator for generating oscillator light that is made to overlap and interfere with reproduced light from the optical recording medium, an oscillator light modulator for producing a given phase difference between the oscillator light and the reproduced light, a light detector for detecting interference light in which the oscillator light and the reproduced light overlap each other, a wavefront deviation detector for detecting an amount of wavefront deviation between the oscillator light and the reproduced light from an output from the light detector, and a compensation amount calculation unit for calculating a wavefront compensation amount from the amount of wavefront deviation. The phase difference produced by the oscillator light modulator is controlled based on the wavefront compensation amount.

13 Claims, 18 Drawing Sheets

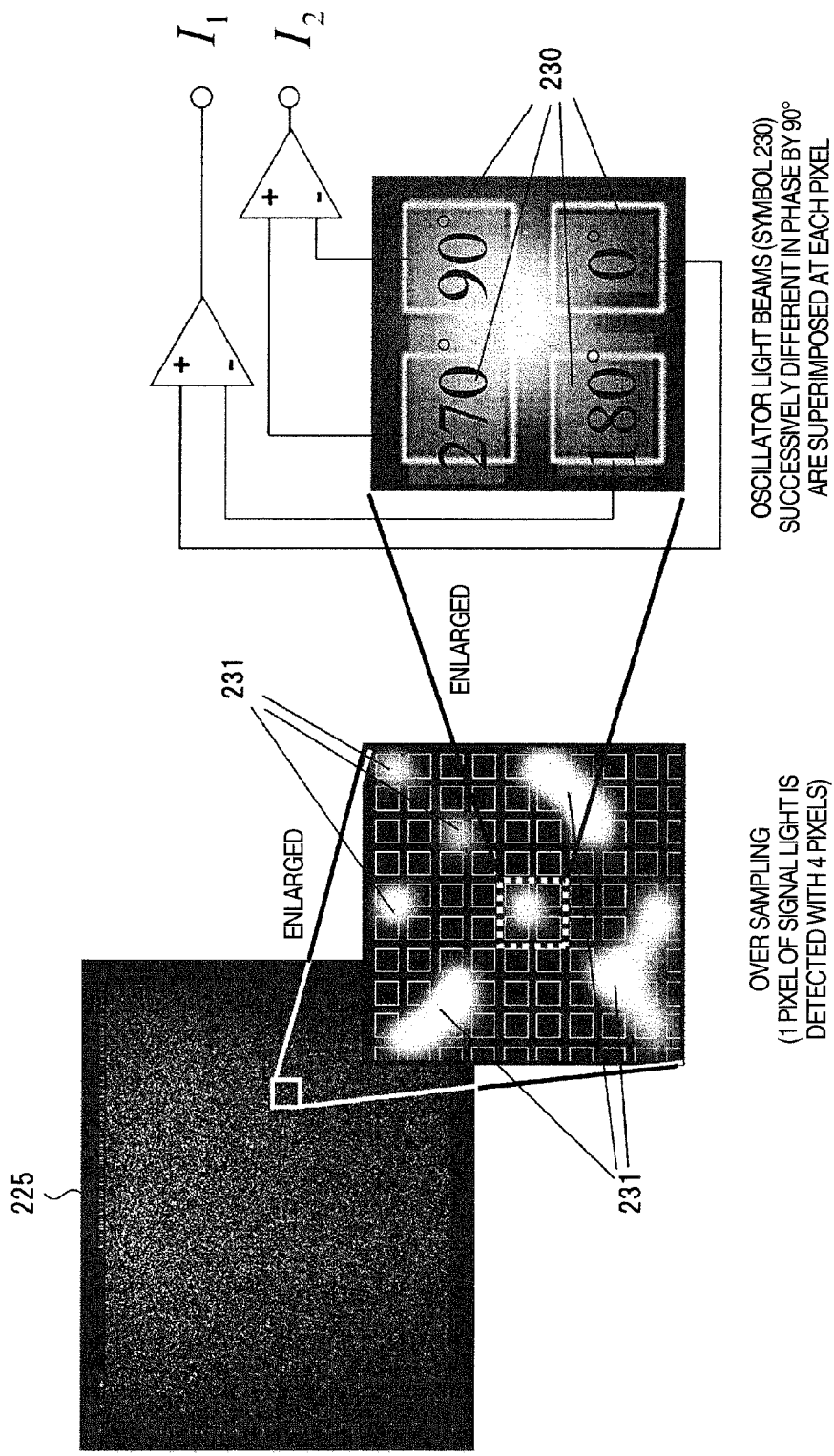

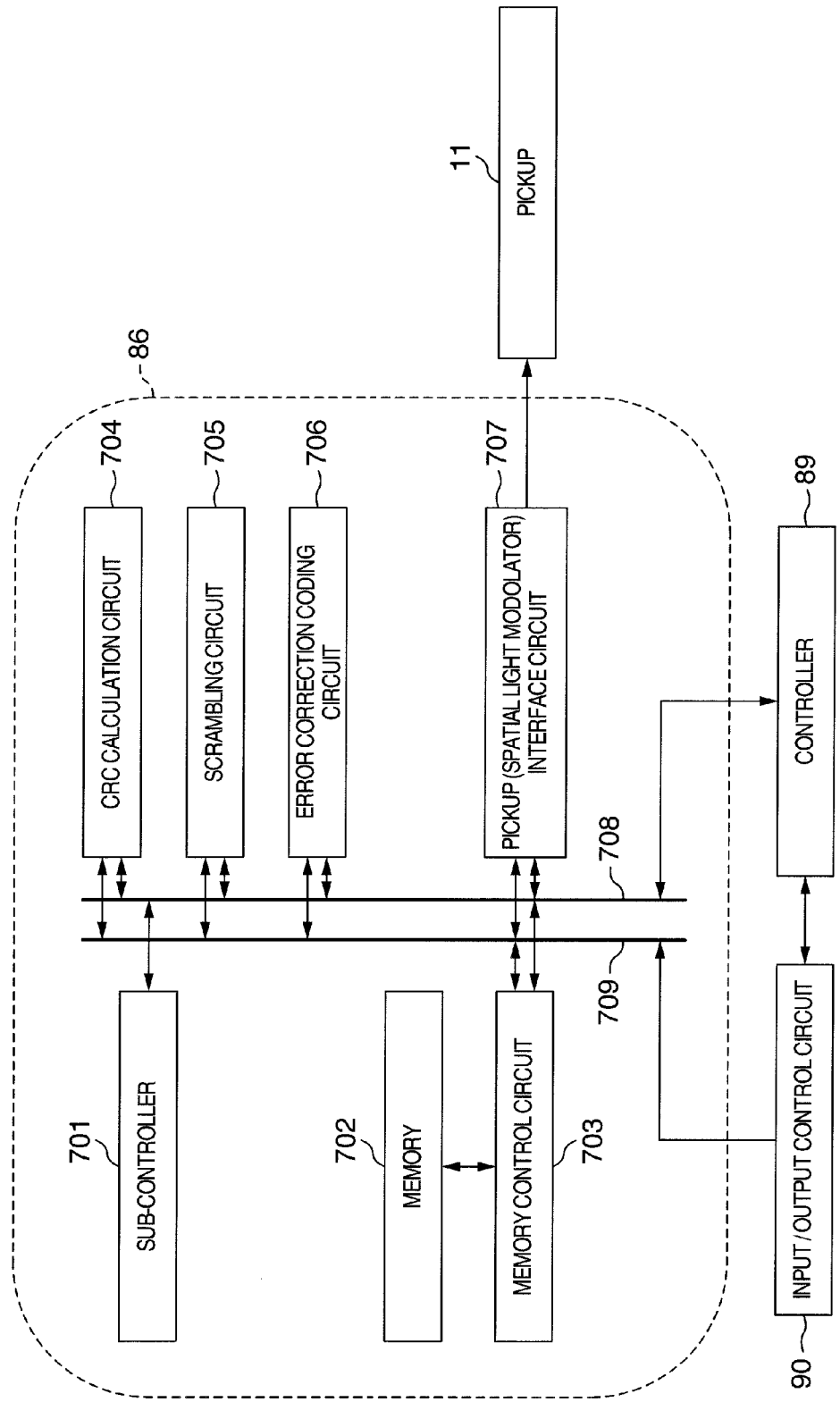

FIG.10
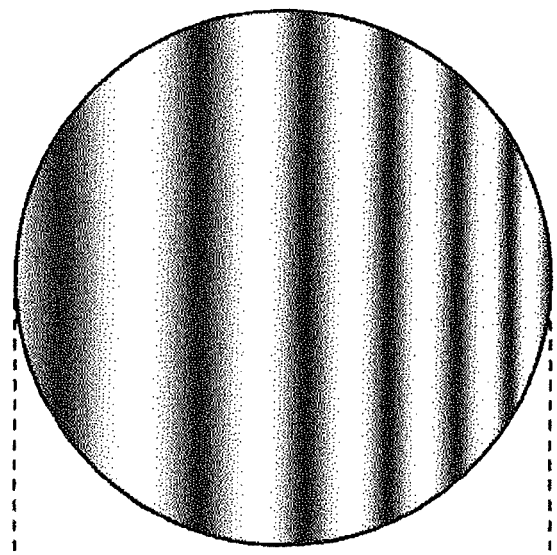
(a)
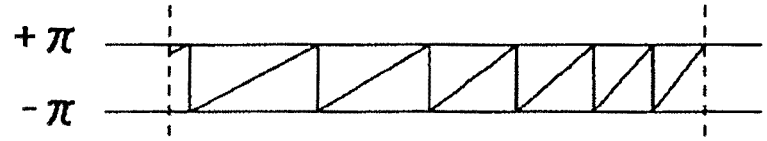
(b)
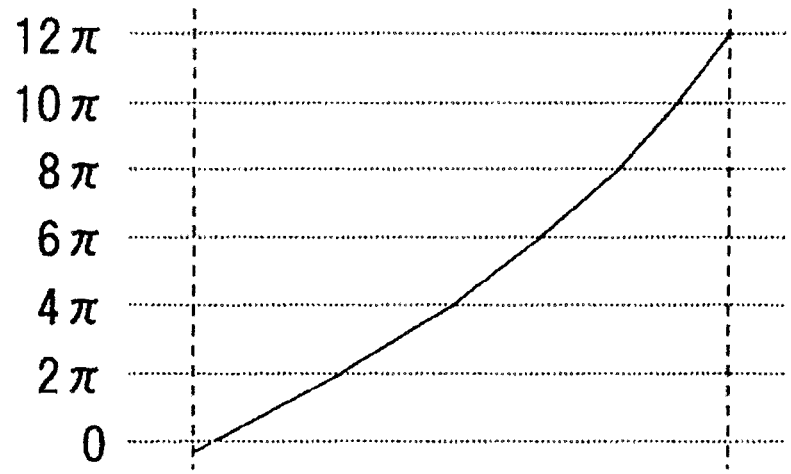
(c)

(a)

(b)

OPTICAL INFORMATION RECORDING/REPRODUCING APPARATUS AND METHOD

INCORPORATION BY REFERENCE

The present application claims priority from Japanese application JP2012-138314 filed on Jun. 20, 2012, the content of which is hereby incorporated by reference into this application.

BACKGROUND OF THE INVENTION

The present invention relates to an optical information recording/reproducing apparatus and a method for recording and/or reproducing information in and from an optical information recording medium using holography.

Today, it has become possible to commercialize optical discs having storage densities on the order of 50 GB in consumer applications owing to the Blue-ray Disc™ standards using blue-violet semiconductor lasers. There is a demand for a technique that will achieve optical discs having larger storage capacities of 100 GB to 1 TB comparable with those of hard disc drives (HDDs).

However, in order to achieve such ultrahigh densities with optical discs, a novel higher-density technique different from a high-density technique relying on higher numerical apertures of objective lenses is needed as well as the use of shorter wavelengths.

While researches concerning next-generation storage techniques are being conducted, a holographic recording technique for recording digital information by employing holography has attracted attention.

The holographic recording technique is a technique for recording information in a recording medium by superimposing signal light having information about pages of data modulated in two dimension by a spatial light modulator with reference light within the recording medium and by producing refractive index modulation in the recording medium by the resulting interference fringe pattern.

During reproduction of information, if the recording medium is illuminated with the reference light used during recording, the hologram recorded in the recording medium acts like a diffraction grating and produces diffracted light. This diffracted light is reproduced as the same light as the recorded signal light including phase information.

The reproduced signal light is detected at high speed in a two-dimensional manner using a light detector array such as a CMOS or CCD sensor. In this way, the holographic recording technique makes it possible to record two-dimensional information in an optical recording medium at once using a single hologram and to reproduce the information. In addition, a plurality of pages of data can be written in a position of a recording medium in an overlapping manner. Hence, massive information can be recorded and reproduced at high speed.

One available holographic recording technique is disclosed, for example, in JP-A-2004-272268, where a so-called angle multiplexed recording method is set forth. A signal light flux is condensed onto an optical information recording medium via a lens. At the same time, the medium is illuminated with reference light of a parallel light flux such that the signal light flux interferes with the reference light, thus recording a hologram. A different page of data is displayed on the spatial light modulator while varying the incident angle of the reference light entering the optical recording medium, thus performing multiplexed recordings.

A means for achieving larger data storages by a holographic recording technique is disclosed, for example, in JP-A-2012-27996, where multi-valued phase information is attached to each pixel of signal light.

SUMMARY OF THE INVENTION

The technique of the above-cited JP-A-2012-27996 has a problem that it is impossible to perform accurate phase detection when diffracted light from a holographic recording medium and oscillator light to which phase information is attached are made to overlap and interfere with each other because the wavefronts of the diffracted light and the oscillator light deviate.

Accordingly, it is an object of the present invention to provide a wavefront compensating method of improving the quality of reproduced light by reducing the deviation in the wavefront between diffracted light and oscillator light.

This object is resolved by the invention set forth in the appended claims.

According to the present invention, the deviation in the wavefront between the diffracted light and the oscillator light can be reduced in the hologram recording and reproducing. Thus, the reproducing performance can be enhanced.

BRIEF DESCRIPTION OF THE DRAWINGS

FIG. 5 schematically illustrates the positional relationship among each pixel in a light optical detector, diffracted light, and oscillator light.

FIG. 7 is a schematic block diagram of a signal generator circuit included within the optical information recording/reproducing apparatus.

FIG. 10 schematically illustrates how processing is performed by a wavefront deviation detection circuit.

DETAILED DESCRIPTION OF THE EMBODIMENTS

The preferred embodiments of the present invention are hereinafter described with reference to the drawings.

Embodiment 1

Figure 2:
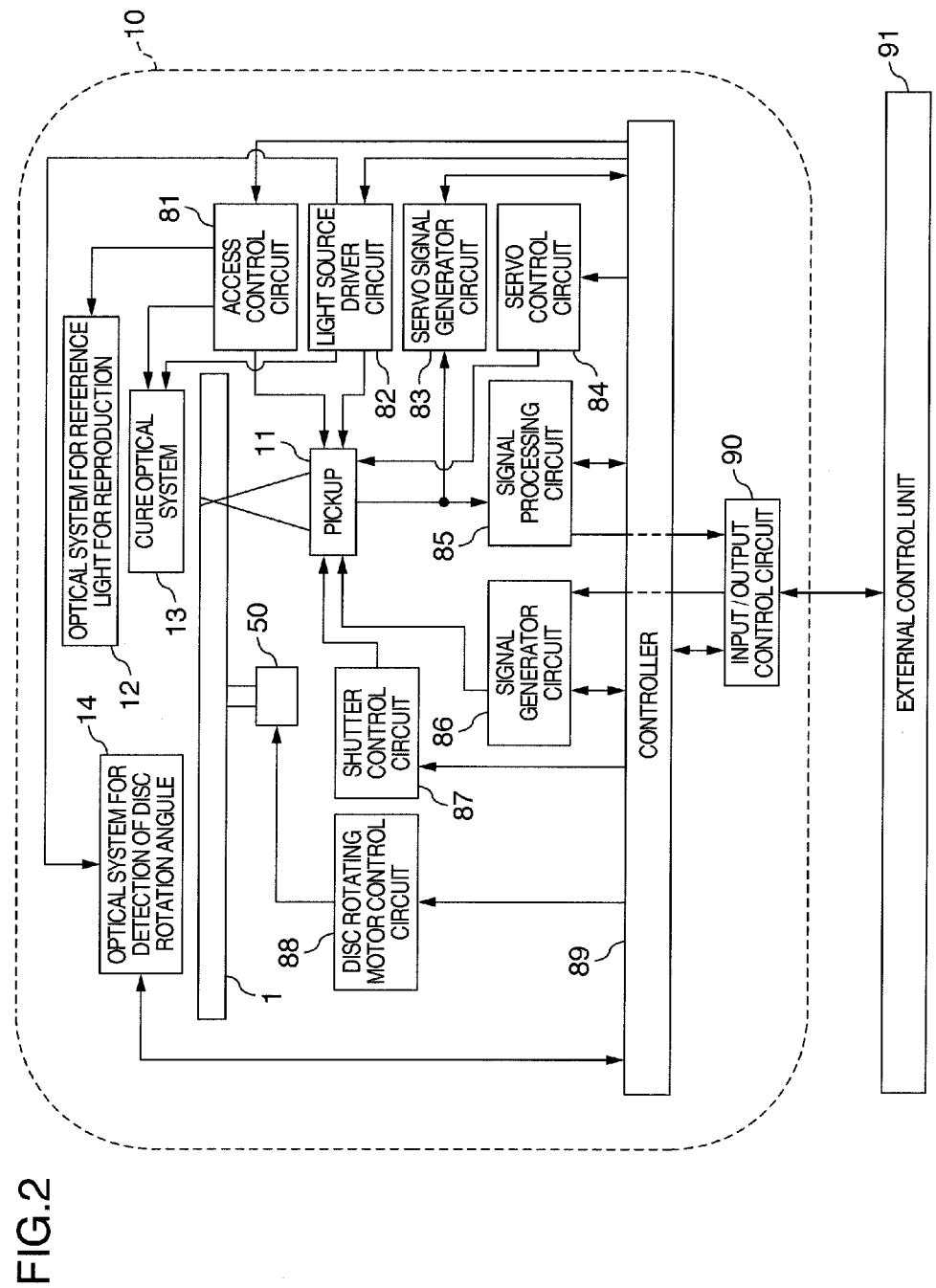
FIG. 2 is a schematic block diagram of an optical information recording/reproducing apparatus according to an embodiment.

One embodiment of the present invention is described with reference to some of the accompanying drawings. FIG. 2 is a block diagram of a recording/reproducing apparatus for holographically recording and/or reproducing digital information in and from an optical information recording medium.

An optical information recording/reproducing apparatus 10 is connected with an external control unit 91 via an input-output control circuit 90. When recording is done, the optical information recording/reproducing apparatus 10 receives an information signal to be recorded from the external control unit 91 via the input/output control circuit 90. When reproduction is done, the optical information recording/reproducing apparatus 10 sends the reproduced information signal to the external control unit 91 via the input-output control circuit 90.

The optical information recording/reproducing apparatus 10 includes an optical pickup 11, an optical system for reference light used for reproduction 12, a cure optical system 13, an optical system for detection of disc angular position 14, and a rotary motor 50. An optical information recording medium 1 is configured to be capable of being rotated by the rotary motor 50.

The optical pickup 11 acts to holographically record digital information to a recording medium by emitting reference light and signal light to the optical information recording medium 1. At this time, the information signal to be recorded is sent to a spatial light modulator included within the pickup 11 via a signal generator circuit 86 by a controller 89. The signal light is modulated by the spatial light modulator.

When the information recorded in the optical information recording medium 1 is reproduced, optical waves, which cause the reference light emitted from the pickup 11 to impinge on the optical information recording medium in a direction opposite to the case of recording, is generated by the optical system for the reference light used for reproduction 12. Light reproduced by the reference light for reproduction is detected by a light detector (described later) included in the pickup 11, and the signal is reproduced by a signal processing circuit 85.

The time for which the optical information recording medium 1 is illuminated with the reference light and the signal light, respectively, can be adjusted by controlling the times for which a shutter included within the pickup 11 is opened and closed by the controller 89 via a shutter control circuit 87.

The cure optical system 13 acts to generate an optical beam used for pre-curing and post-curing of the optical information recording medium 1. The pre-curing is a pre-processing in which a given optical beam is illuminated to a desired position prior to the illumination of reference light and signal light when information is recorded at a desired position within the optical information recording medium 1. The post-curing is a post-processing in which after information has been recorded at a desired position in the optical information recording medium 1, a given optical beam is illuminated to the desired position to render the desired position non-writable.

The optical system for detection of disc angular position 14 is used to detect the angular position of the optical information recording medium 1. Where the medium 1 is adjusted to a given angular position, a signal corresponding to the angular position is detected by the optical system for angular position detection 14. Using the detected signal, the controller 89 can control the disc angular position of the recording medium 1 via a disc rotating motor control circuit 88.

A given light source driver current from a light source driver circuit 82 is supplied to power supplies within the optical pickup 11, cure optical system 13, and disc angular position detecting optical system 14. Optical beams can be emitted from respective light sources at predetermined amounts of light.

Each of the optical pickup 11 and disc curing optical system 13 is equipped with a mechanism capable of positionally sliding in a radial direction of the optical information recording medium 1. Their positions can be controlled via an access control circuit 81.

Incidentally, recording techniques utilizing the principle of the angle multiplexing of holography tend to have quite tight tolerances for deviations of the angle of the reference light. Accordingly, it is necessary that a mechanism for detecting the amount of deviation of the angle of the reference light within the pickup 11 is provided, a signal for providing servo control is generated by a servo signal generator circuit 83, and a servo mechanism for correcting the amount of deviation via a servo control circuit 84 is provided in the optical information recording/reproducing apparatus 10.

Some or all of the optical components of the optical pickup 11, cure optical system 13, and disc angular position detecting optical system 14 may be integrated for simplifying the configuration.

Figure 3:
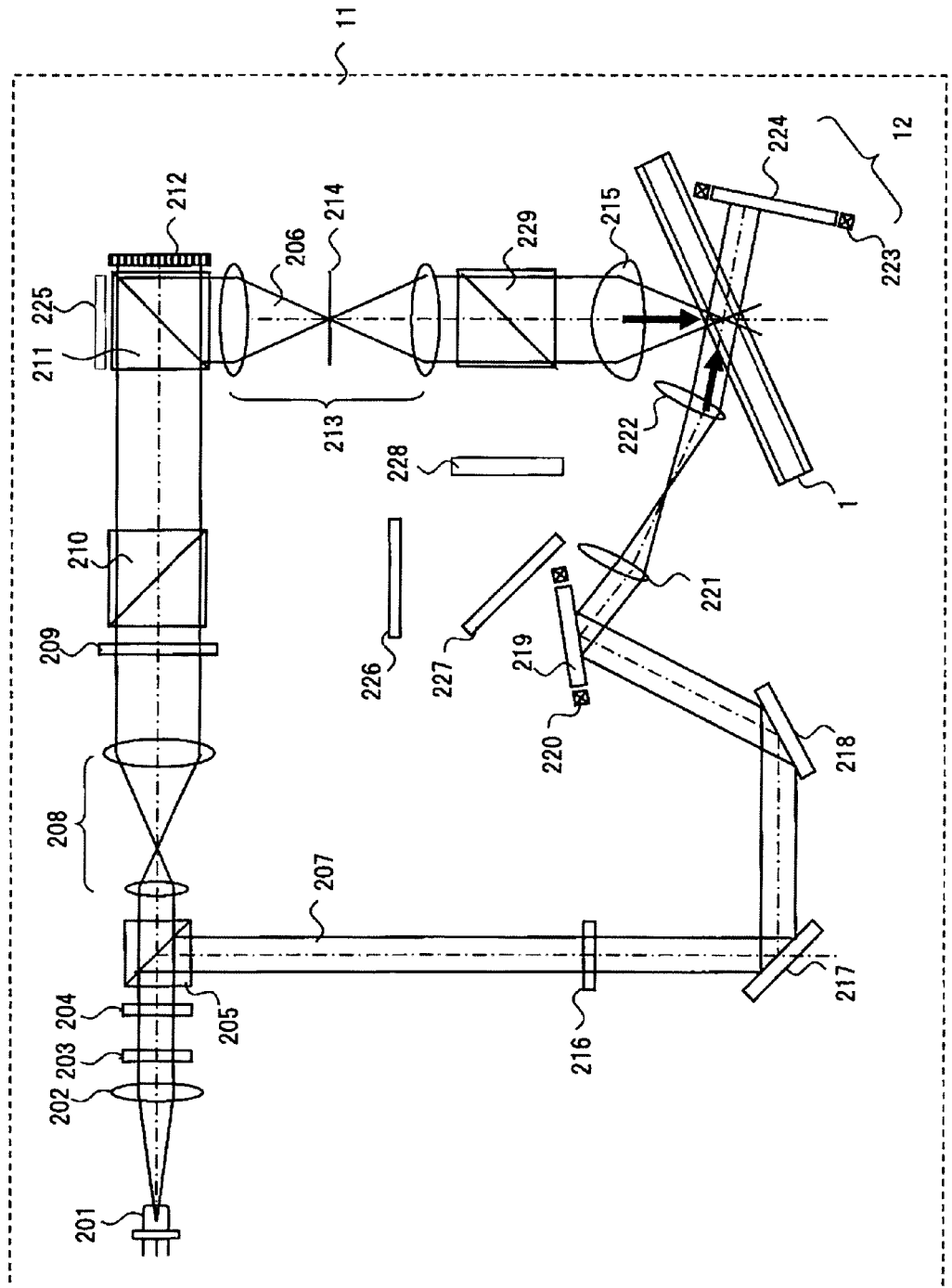
FIG. 3 is a schematic optical ray diagram illustrating an optical pickup included within the optical information recording/reproducing apparatus.

FIG. 3 illustrates the recording principle of one example of a fundamental optical arrangement of the optical pickup 11 in the optical information recording/reproducing apparatus 10. An optical beam emitted from a light source 201 passes through a collimate lens 202 and enters a shutter 203. When the shutter 203 is open, the optical beam passes through the shutter 203 and then is controlled in the direction of polarization such that the light amount ratio of a P polarization to an S polarization becomes equal to a desired ratio by a polarization direction converter device 204 such as a ½ wave plate. The beam then enters a polarizing beam splitter 205.

Figure 18:
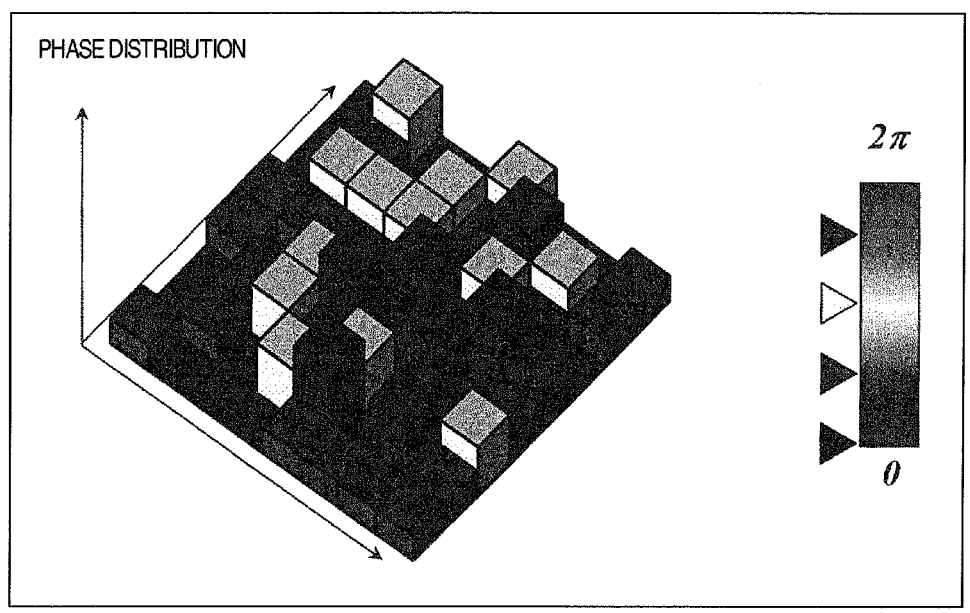
FIG. 18 schematically illustrates a phase distribution of page data.

The light beam passed through the polarizing beam splitter 205 is increased in beam diameter by a beam expander 208 and then passed through a polarization direction converter device 209, a polarizing beam splitter 210, and another polarizing beam splitter 211 and enters a spatial light modulator 212. This modulator 212 converts the light beam into page data where phase information is attached to each pixel, for example, as shown in FIG. 18. The phase distribution across each page data is made such that a light intensity distribution on a Fourier plane of the optical information recording medium 1 is free of DC intensities (so-called hot spots), for example. Consequently, it is possible to eliminate a phase mask that has been conventionally used to reduce DC intensities. As one example, the phase distribution is determined such that the average value of the phases attached to individual pixels becomes $\pi$. As another example, the phase distribution is determined such that the average value of phases attached to individual pixels becomes 0.5π or 1.5π. As a further example, the number of pixels whose phases are randomized based on phase=0 within one page and the number of pixels whose phases are randomized based on phase=π are made equal.

The spatial light modulator 212 is not restricted to spatial light modulators having only the function of modulating phases. Amplitudes can be modulated spatially by imparting a function of modulating amplitudes to the spatial light modulator 212.

The signal light 206 converted into page data by the spatial light modulator 212 is reflected by the polarized beam splitter 211 and propagates through both a relay lens 213 and a spatial filter 214. Then, the signal light 206 passes through a non-polarizing beam splitter 229 and is condensed onto the optical information recording medium 1 by an objective lens 215.

On the other hand, the optical beam reflected by the polarizing beam splitter 205 acts as reference light 207 whose direction of polarization is set according to whether it is during recording or during reproduction by a polarization direction converter device 216. Then, the beam enters a mirror 219 via other mirrors 217 and 218. The angle of the mirror 219 can be adjusted by an actuator 220. After passing through lenses 221 and 222, the beam enters the optical information recording medium 1.

In this way, the signal light 206 and the reference light 207 are made to enter the optical information recording medium 1 such that they overlap each other. Thus, an interference fringe pattern is created in the recording medium. Information is recorded by writing the pattern into the recording medium. Since the angle of incidence of the reference light 207 entering the recording medium 1 can be varied with the mirror 219, recording utilizing angle multiplexing can be performed.

In holograms recorded in the same region with different angles of the reference light, a hologram corresponding to each one reference light angle is hereinafter referred to as a holographic page or simply as a page, and a collection of pages recorded by angle multiplexing in the same region is referred to as a block.

Figure 4:
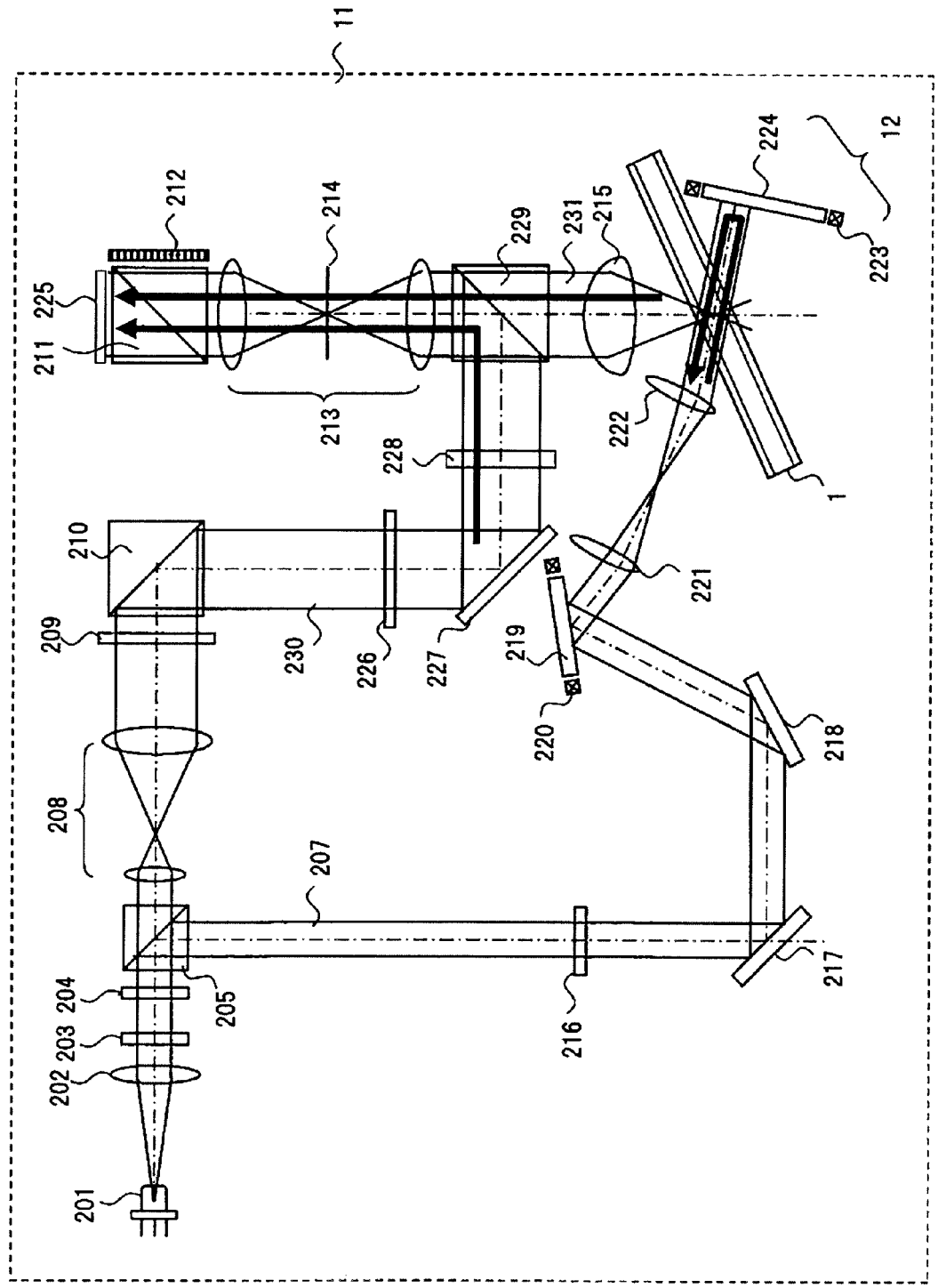
FIG. 4 is a schematic optical ray diagram illustrating an optical pickup included within the optical information recording/reproducing apparatus.

FIG. 4 illustrates the principle on which information is reproduced by one example of the fundamental optical arrangement of the optical pickup 11 of the optical information recording/reproducing apparatus 10. The referent light 207 enters the optical information recording medium 1, passing the same path as during recording. In the present embodiment, a reproduction method using phase conjugated light is adopted. Information is reproduced by the use of the reference light 207 that again enters the optical information recording medium 1 after being reflected by a mirror 224 which is driven by an actuator 223. Diffracted light 231 from the medium 1 passes through the objective lens 215, the non-polarizing beam splitter 229, relay lens 213, spatial filter 214, and polarizing beam splitter 211 and enters a light detector 225.

To generate oscillator light 230 that interferes with the diffracted light 231 in the light detector 225, the direction of polarization is controlled by the polarization direction converter device 204. A desired amount of light passes through the polarizing beam splitter 205. The oscillator light 230 transmitted through the polarizing beam splitter 205 passes through the beam expander 208 and then the direction of polarization is controlled by the polarization direction converter device 209. The light 230 is reflected by the polarizing beam splitter 210. Then, the direction of polarization of the oscillator light 230 is rotated through 90 degrees by a ½ wave plate 226, and then the oscillator light is reflected by a mirror 227. The light then enters a spatial light modulator 228, which in turn adds at least four phases including a given reference phase and three phases different from the reference phase by 90°, 180°, and 270°, respectively, to the oscillator light 230. The oscillator light 230 reflected from the non-polarizing light splitter 229 enters the light detector 225 via the relay lens 213, spatial filter 214, and polarizing light beam splitter 211. Then, the oscillator light 230 overlaps and interferes with the diffracted light 231.

FIG. 5 schematically illustrates the arrangement of pixels and a positional relationship between the diffracted light 231 and the oscillator light 230 in the light detector 225. FIG. 5 depicts page data obtained by performing amplitude modulation in addition to phase modulation. The data may also be white page data not subjected to amplitude modulation. The pixels on the light detector are arranged such that over sampling is done at least four pixels correspond to each pixel about a page data. The oscillator light 230 is added with four phases, a reference phase (set to 0° for the sake of convenience in the present embodiment), second phase set to the reference phase +90°, third phase set to the reference phase +180°, and fourth phase set to the reference phase +270°. These oscillator lights 230 for which over sampling was done are made to enter each of the four pixels, respectively. $I_1$ and $I_2$ used in FIG. 5 are that $I_1$ is the difference between the output value from the pixel impinged by the oscillator light 230 to which the reference phase is added and the output value from the pixel impinged by the the output value from the pixel impinged by the oscillator light 230 to which the reference phase +270° is added and the output value from the pixel impinged by the oscillator light 230 to which the reference phase +90° is added. For the sake of convenience, FIG. 5 shows the positional relationship between the diffracted light 231 and the oscillator light 230 for some of the pixels of the light detector 225. It is assumed herein that the same positional relationship fundamentally holds for all the combinations of four pixels used for over sampling.

Using the configuration described so far and the principle of the method of fringe scanning generally used in interferometers, the phase difference Δφ between the diffracted light 231 incident on each pixel and the reference phase added to the oscillator light 230 can be calculated using Eq. (1), where $I_1$ and $I_2$ are defined as illustrated in FIG. 5. Consequently, the phase information added to each pixel of page data can be detected.

$$\Delta\phi = \tan^{-1}\left(\frac{I_2}{I_1}\right) \quad (1)$$

Further, to provide compatibility in reproducing page data which have undergone amplitude modulation without performing multi-valued phase recording, for example, the operation of the means for generating the oscillator light 230 is stopped to cease the generation of the oscillator light and reproduction is performed. Consequently, reproduction compatibility of the apparatus can be accomplished. Although an image sensor such as a CMOS image sensor or a CCD image sensor can be used as the light detector 225, any type of device can be used as long as page data can be reproduced.

Figure 6C:
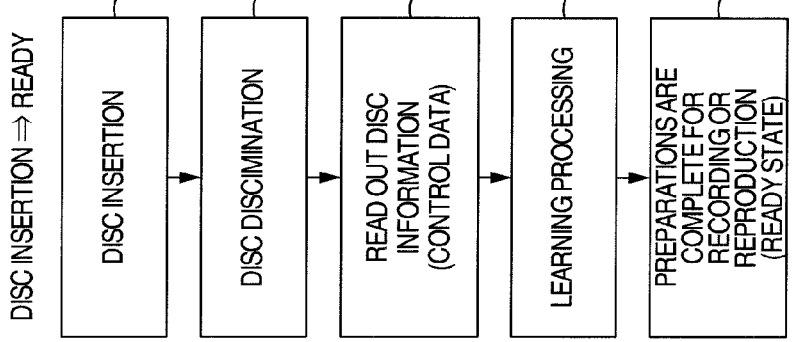
FIGS. 6A-6C are flowcharts illustrating sequences of operations performed by the optical information recording/reproducing apparatus.
Figure 6B:
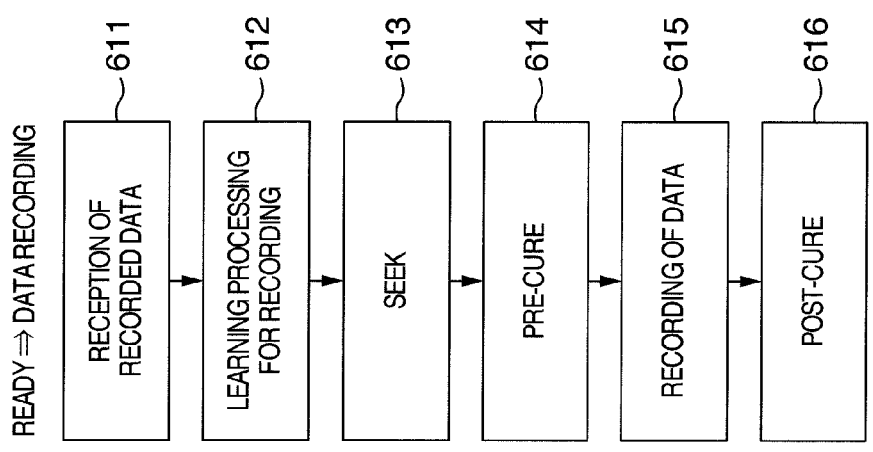
Figure 6A:
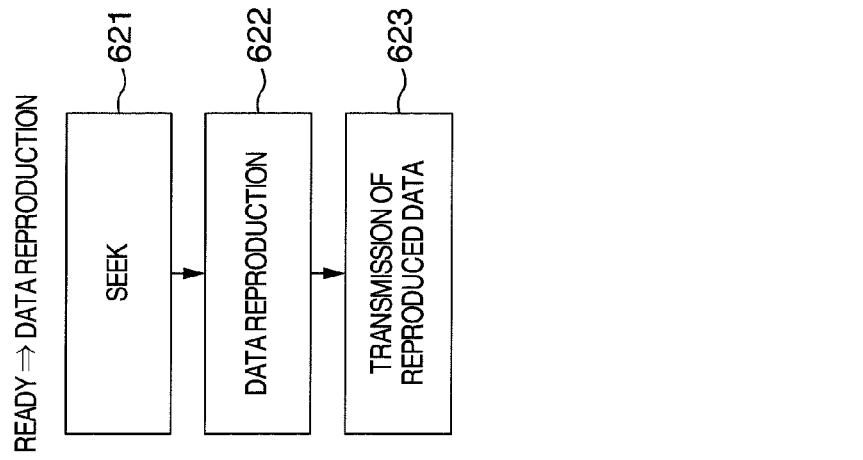

FIGS. 6A-6B are flowcharts illustrating sequences of operations for recording and reproducing data by the optical information recording/reproducing apparatus 10. It is here assumed that recording and reproduction are made using holography.

FIG. 6A is a flowchart illustrating a sequence of operations performed after insertion of the optical information recording medium 1 into the optical information recording/reproducing apparatus 10 until completion of preparations for recording or reproduction. FIG. 6B is a flowchart illustrating a sequence of operations performed from the state in which preparations are complete until information is recorded in the recording medium 1. FIG. 6C is a flowchart illustrating a sequence of operations performed from the state in which preparations are complete until information recorded in the recording medium 1 is reproduced.

As illustrated in FIG. 6A, when the medium is inserted (601), the optical information recording/reproducing apparatus 10 discriminates, for example, whether the inserted disc is a medium permitting digital information to be recorded and reproduced holographically (602).

If the decision is that the disc is an optical information recording medium in which digital information is read and/or reproduced using holography, the optical information recording/reproducing apparatus 10 reads control data from the medium (603) and obtains information, for example, about the optical information recording medium or information about various setting conditions used during recording or reproduction.

After reading of the control data, a learning processing (604) regarding various adjustments according to the control data and regarding the optical pickup 11 is performed. The optical information recording/reproducing apparatus 10 completes the preparation for recording or reproduction (605).

A sequence of operations performed from the state in which preparations are complete until information is recorded is illustrated in FIG. 6B. First, data to be recorded is received (611), and then information corresponding to the data is supplied to the spatial light modulator within the optical pickup 11.

Then, to permit high-quality information to be recorded in the optical information medium, a learning step for various recordings such as optimization of the power of the light source 201 or optimization of the exposure time using the shutter 203 is performed in advance according to need (612).

Then, in a seek step (613), the access control circuit 81 is controlled to place the optical pickup 11 and the cure optical system 13 in predetermined positions relative to the optical information recording medium. If the optical information recording medium 1 includes address information, the address information is reproduced. It is checked whether they are in the target positions, and if not so, the amounts of deviation from the predetermined positions are calculated and the operation of the positioning is repeated.

Then, a predetermined region is pre-cured using an optical beam emitted from the cure optical system 13 (614), and data is recorded using the reference light and signal light emitted from the pickup 11 (615).

After recording of the data, post-curing is done using the optical beam emitted from the cure optical system 13 (616). If necessary, the data may be verified.

A sequence of operations performed from the state in which preparations are complete until the recorded information is reproduced is illustrated in FIG. 6C. First, in a seek step (621), the access control circuit 81 is controlled to place the pickup 11 and the optical system for the reference light for reproduction 12 in predetermined positions relative to the optical information recording medium. If the optical information recording medium 1 includes address information, the address information is reproduced. It is checked whether they are in the target positions, and if not so, the amounts of deviation from the desired positions are calculated and the operation of the positioning is repeated.

Then, the reference light is emitted from the optical pickup 11, and information recorded in the optical information recording medium is read out (622) and reproduced data is transmitted (623).

Figure 9A:
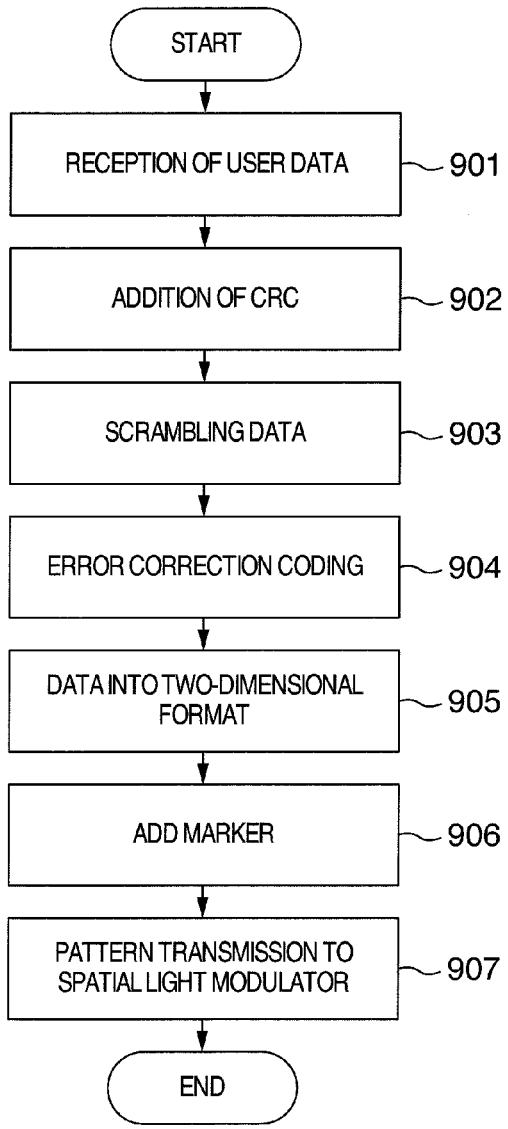
FIGS. 9A and 9B are flowcharts illustrating sequences of operations performed by the signal generator circuit and the signal processing circuit.
Figure 9B:
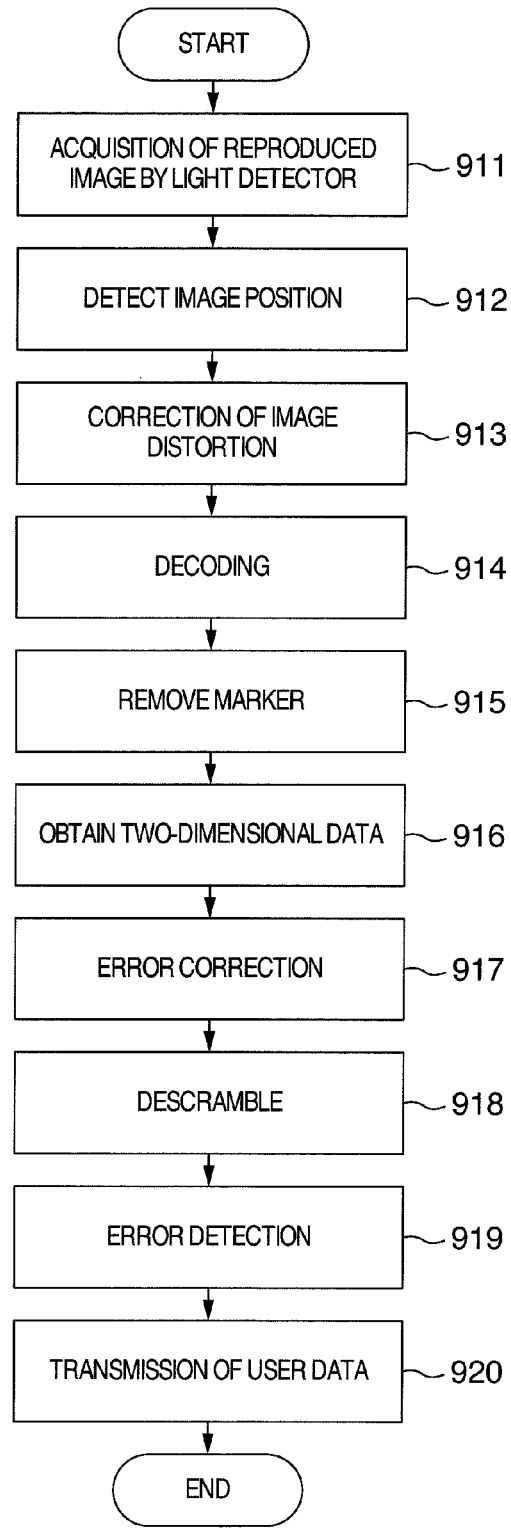

FIGS. 9A and 9B are flowcharts illustrating data processing performed during recording and reproduction. FIG. 9A is a flowchart illustrating a sequence of operations performed by the signal generator circuit 86 until data is converted into two-dimensional data on the spatial light modulator 212 after reception of recorded data (611) at the input-output control circuit 90. FIG. 9B is a flowchart illustrating reproduced data processing performed by the signal processing circuit 85 until transmission of reproduced data (623) from the input-output control circuit 90 after detection of two-dimensional data at the light detector 225.

Data processing performed during recording is described with reference to FIG. 9A. When user data is received (901), the data is divided into data streams and subjected to a cyclic-redundancy check (CRC) so that error detection can be performed during reproduction (902). The data streams are scrambled (903) by adding a pseudorandom data sequence to the data streams in order to prevent repetition of the same pattern. Then, error correction coding such as Reed Solomon encoding is performed (904) to permit an error correction during reproduction. The data sequence is then converted into two-dimensional data of M×N. By repeating this for one page data, one page of two-dimensional data (905) is constructed. A marker which will provide a reference in detecting image positions or correcting image distortions during reproduction is added (906) to the two-dimensional data constructed in this way. The data is transferred to the spatial light modulator 212 (907).

A sequence of operations for processing data during reproduction is next described by referring to FIG. 9B. Image data detected by the light detector 225 is transferred to the signal processing circuit 85 (911). An image position is detected based on the marker contained in the image data (912). Distortions of the tilt of the image, magnification in the image are corrected (913), decoding is performed (914), and the marker is removed (915). Thus, one page of two-dimensional data is obtained (916). Two-dimensional data obtained in this way is converted into data strings, and then an error correction is made (917) to remove the parity data string. Next, after descrambling (918) is performed, an error detection using CRC is performed (919) to remove the CRC parity, and then the user data is sent via the input-output control circuit 90 (920).

FIG. 7 is a block diagram of the signal generator circuit 86 of the optical information recording/reproducing apparatus 10.

When entering of user data to the input-output control circuit 90 is started, the input-output control circuit 90 gives a notice of the start of the entry of the user data to the controller 89. Receiving the notice, the controller 89 instructs the signal generator circuit 86 to record one page of data entered from the input-output control circuit 90. The instructions from the controller 89 are given to a sub-controller 701 within the signal generator circuit 86 through a control line 708. Receiving the instructions, the sub-controller 701 controls the various signal processing circuits via the control line 708 such that these signal processing circuits operate in parallel. First, a memory control circuit 703 is controlled such that the user data entered from the input-output control circuit 90 is stored into a memory 702 via a data line 709. When the user data stored in the memory 702 reaches a given amount, a CRC calculation circuit 704 is controlled such that the user data is converted into CRC-processed data. The CRC-processed data is scrambled by adding a pseudorandom data sequence to the CRC-processed data by a scrambling circuit 705. An error correction coding circuit 706 performs error correction coding consisting of adding a parity data sequence. Finally, a pickup interface circuit 707 reads the error correction encoded data from the memory 702 in the order of the array of two-dimensional data elements on the spatial light modulator 212, a marker providing a reference during reproduction is added, and then the two-dimensional data is transferred to the spatial light modulator 212 within the optical pickup 11.

Figure 8:
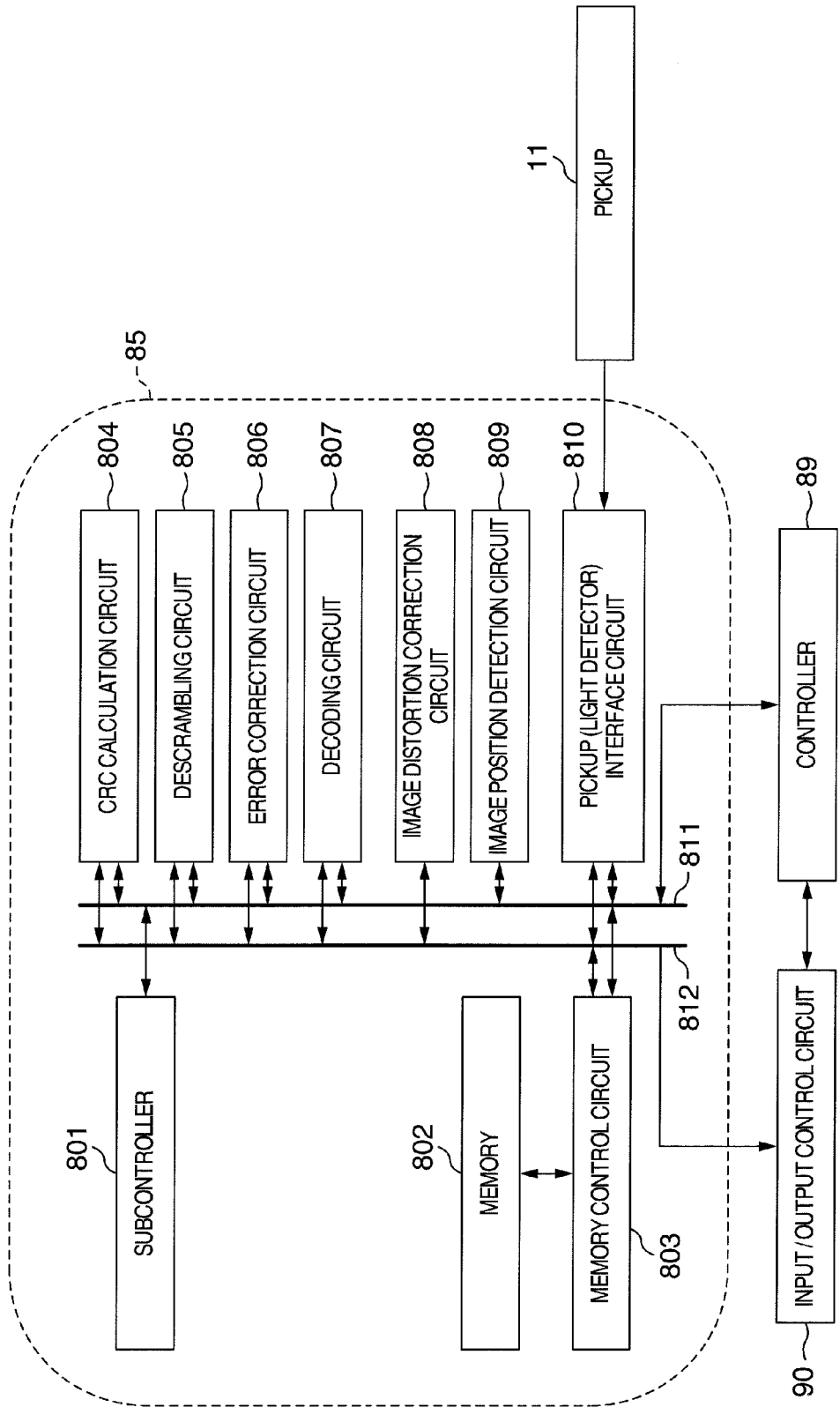
FIG. 8 is a schematic block diagram of a signal processing circuit included within the optical information recording/reproducing apparatus.

FIG. 8 is a block diagram of the signal processing circuit 85 of the optical information recording/reproducing apparatus 10.

When the light detector 225 within the optical pickup 11 detects image data, the controller 89 instructs the signal processing circuit 85 to reproduce one page of data entered from the pickup 11. The instructions from the controller 89 are given to the sub-controller 801 within the signal processing circuit 85 via a control line 811. Receiving the instructions, the sub-controller 801 controls various signal processing circuits via the control line 811 such that these signal processing circuits operate in parallel. First, a memory control circuit 803 is controlled such that image data entered from the pickup 11 via a pickup interface circuit 810 is stored into a memory 802 via a data line 812. When the data stored in the memory 802 reaches a given amount, control is provided such that an image position detection circuit 809 detects a marker from the image data stored in the memory 802 and extracts an effective data range. Then, using the detected marker, an image distortion correction circuit 808 performs corrections of the image tilt, magnification, and distortions, and then, control is provided such that the image data is converted into a desired size of two-dimensional data. A decoding circuit 807 is controlled to discriminate whether each bit of data constituting the two-dimensional data of the converted size is multivalued data, decodes each bit of data, and stores the data in the memory 802 such that the data elements are arrayed in the same order as when reproduced and output. Then, an error correction circuit 806 corrects errors in the data sequences, and a descrambling circuit 805 descrambles the data sequences, i.e., removes the added pseudorandom data sequence. Then, a CRC calculation circuit 804 checks whether user data in the memory 802 contains error. Subsequently, the user data is transferred from the memory 802 to the input-output control circuit 90.

Here, compensation of the wavefront of the oscillator light provided by the optical information recording/reproducing apparatus of the present embodiment described so far is one feature of the present embodiment and described in further detail. In the multivalued phase reproduction method of the present embodiment, the oscillator light 230 and diffracted light 231 of FIG. 4 are made to overlap and interfere with each other on the light detector 225. As a result, phase information can be obtained. However, if the wavefront of the oscillator circuit 230 is not coincident with the wavefront of the diffracted light 231, correct phase information can not be derived. If the oscillator circuit 230 and the diffracted light 231 are neither amplitude modulated nor phase modulated, the disagreement in wavefront appears as interference fringes. Consequently, the wavefront deviation can be detected from the interference fringes, and the wavefront of the oscillator circuit 230 may be compensated.

Figure 1:
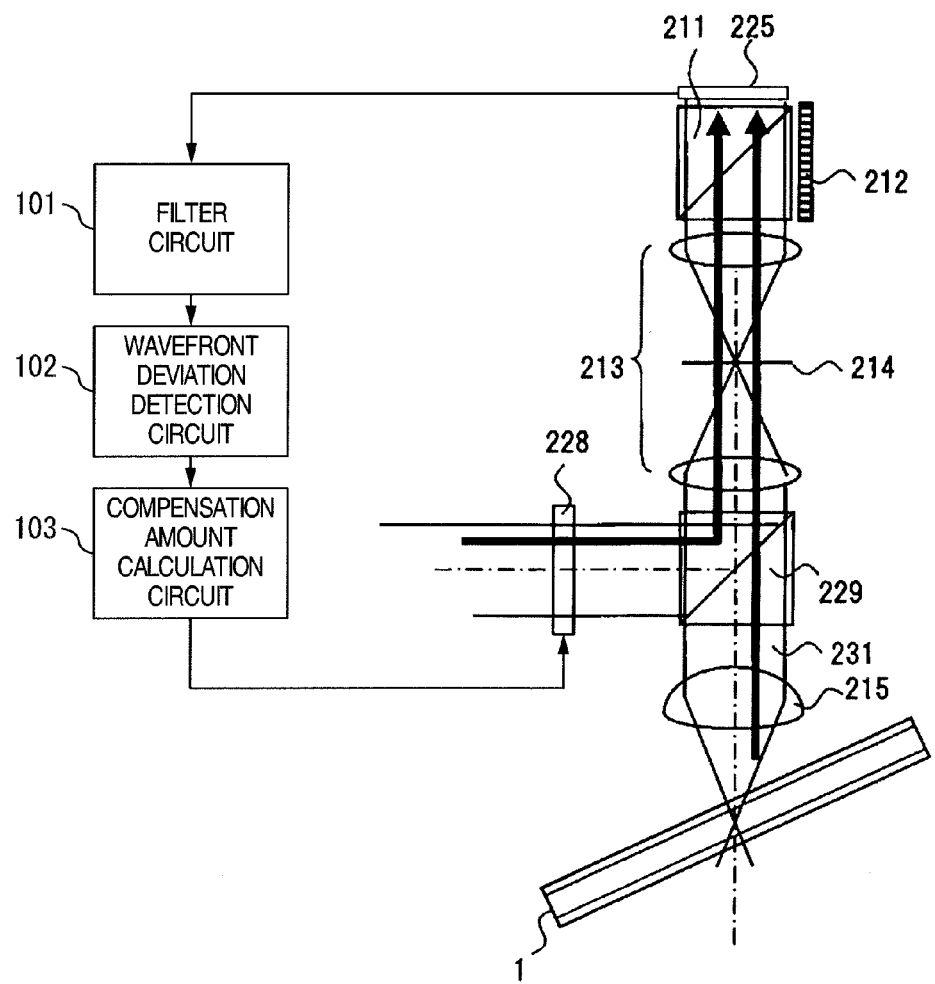
FIG. 1 is a schematic optical ray diagram for wavefront deviation detection and compensation control according to an embodiment.
Figure 11:
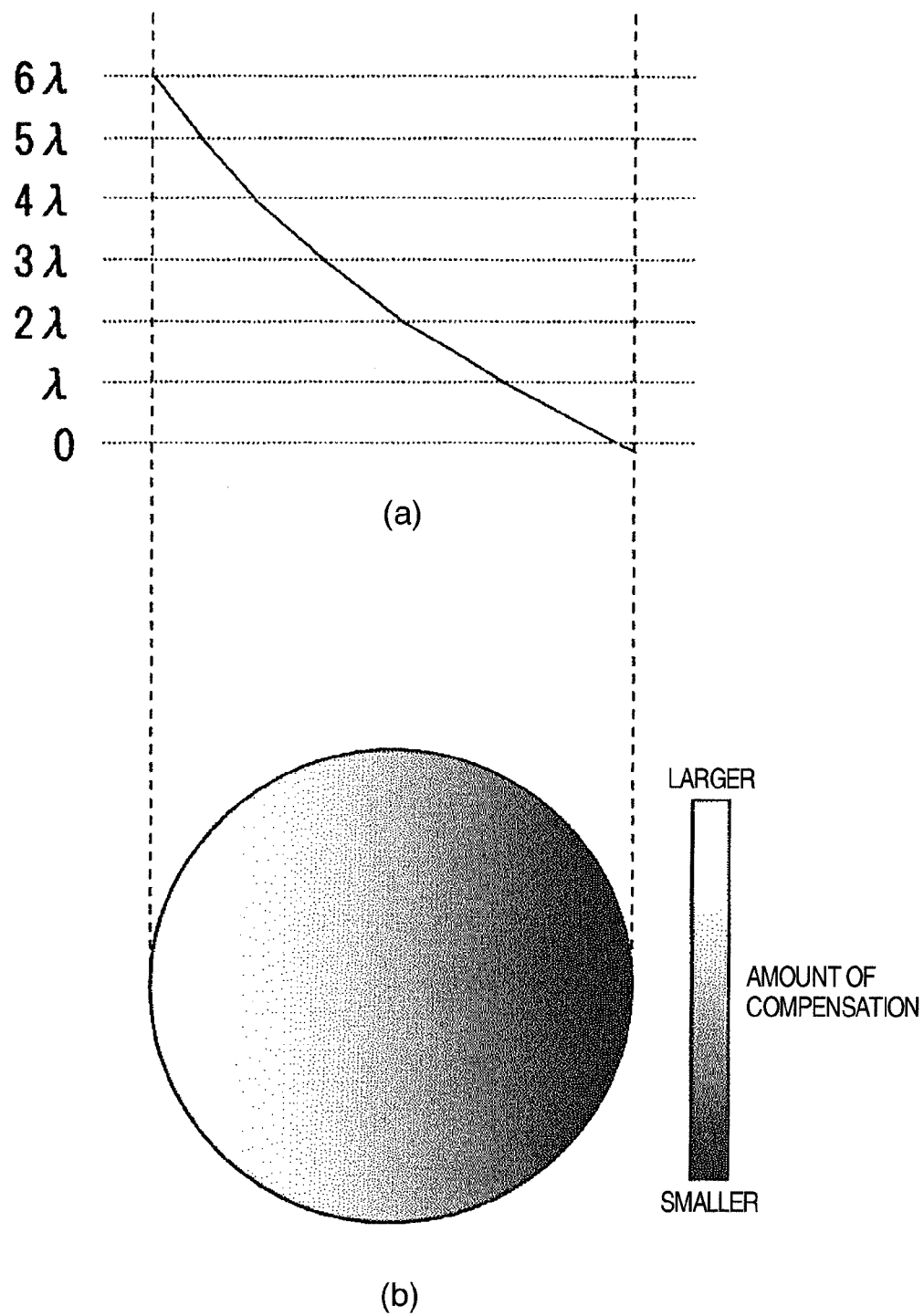
FIG. 11 schematically illustrates how processing is performed by a compensation amount calculation circuit.

A procedure for detecting the wavefront deviation and providing compensation according to the present embodiment is described by referring to FIGS. 1, 10, and 11.

The configuration of a wavefront compensation circuit used for this purpose is shown in FIG. 1. First, phase information calculated from the output from the light detector 225 is entered into a filter circuit 101. Since phase information is added to each pixel by the spatial light modulator 212 during recording, the phases indicated by the phase information are not continuous for each pixel. Therefore, under this condition, interference fringes caused by wavefront deviations can not be created. Accordingly, the filter circuit 101 averages out the phase information by means of a low-pass filter, thus calculating interference fringes caused by wavefront fringes (FIG. 10, (*a*)). The interference fringes are entered into a wavefront deviation detection circuit 102. Preferably, the low-pass filter is designed to pass the frequencies of the interference fringes. The wavefront deviation detection circuit 102 calculates phase differences (FIG. 10, (*b*)) from the interference fringes (FIG. 10, (*a*)) and connects together non-continuous points (FIG. 10, (*c*)). In this way, the amounts of wavefront deviations are calculated and entered into the compensation amount calculation circuit 103. The compensation amount calculation circuit 103 calculates amounts of compensation that cancel out the calculated wavefront deviations (FIG. 11, (*a*)). In the spatial light modulator 228, at least four phases including the reference phase and other phases different from the reference phase are added to the oscillator light 230. The spatial light modulator 228 is controlled such that the reference phase gives these amounts of compensation (FIG. 11, (*b*)). Therefore, the spatial light modulator 228 is preferably designed such that the phase amount to modulate can be varied electrically such as a liquid-crystal device.

The configuration described so far makes it possible to provide compensation of the deviation in wavefront between the oscillator light and the diffracted light in the recording/reproducing optical system for holograms. The reproducing performance can be improved.

In the present embodiment, the controlled subject is the spatial light modulator 228. However, the subject is not restricted to the spatial light modulator 228, a wavefront control device such as a deformable mirror or liquid-crystal display may be inserted in the optical path of the oscillator light 230. Also, the wavefront compensation may be provided by controlling the positions and characteristics of the devices constituting the pickup 11. Furthermore, although in the present embodiment, the amounts of compensation are calculated directly from the wavefront deviations, the spatial light modulator 228 may be controlled to minimize the deviations using feedback control.

Further, in the description of the present embodiment, recording and reproduction using multivalued phases is taken as one example. The same principle can also be applied to an optical system where oscillator light and reproduced light (diffracted light in the present embodiment) are made to interfere with each other like homodyne detection. Additionally, in recording and reproduction using muitivalued phases, the present invention is not restricted to the present embodiment. The invention can also be applied to detection of phase information using a method in which oscillator light is made to interfere with reproduced light a plurality of times while varying the phase of the oscillator light such as a fringe scan method.

Embodiment 2

The present embodiment is similar to Embodiment 1 except for the detection of wavefront deviations and compensation procedure.

In Embodiment 1, a low-pass filter is used to obtain the interference fringes arising from the wavefront deviation between the oscillator light 230 and the diffracted light 231. Generally, the wavefront deviation varies little among pages. In contrast, phase information generally has no inter-page dependency. Therefore, interference fringes may also be obtained by averaging out phase the information over the pages.

Figure 12:
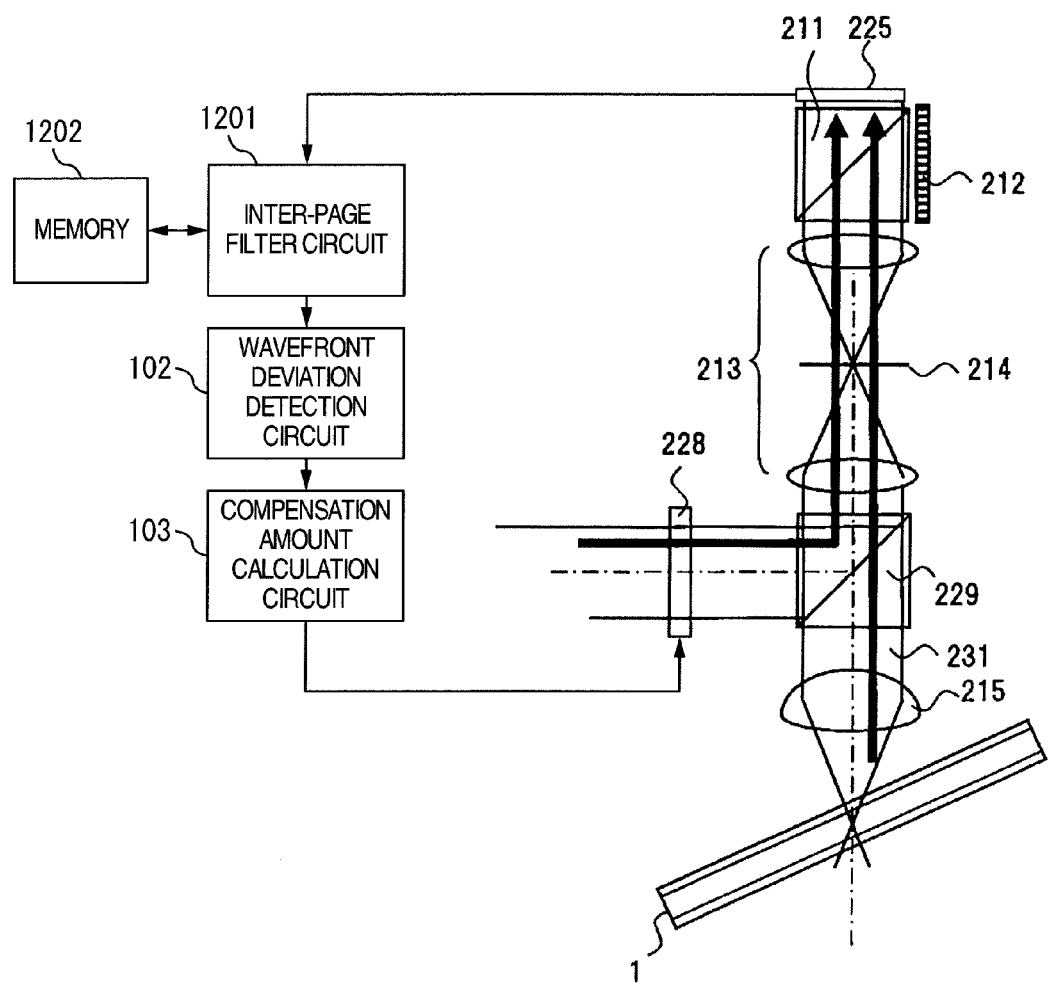
FIG. 12 is a schematic block diagram of an example of a system for achieving wavefront deviation detection and compensation control.
Figure 13:
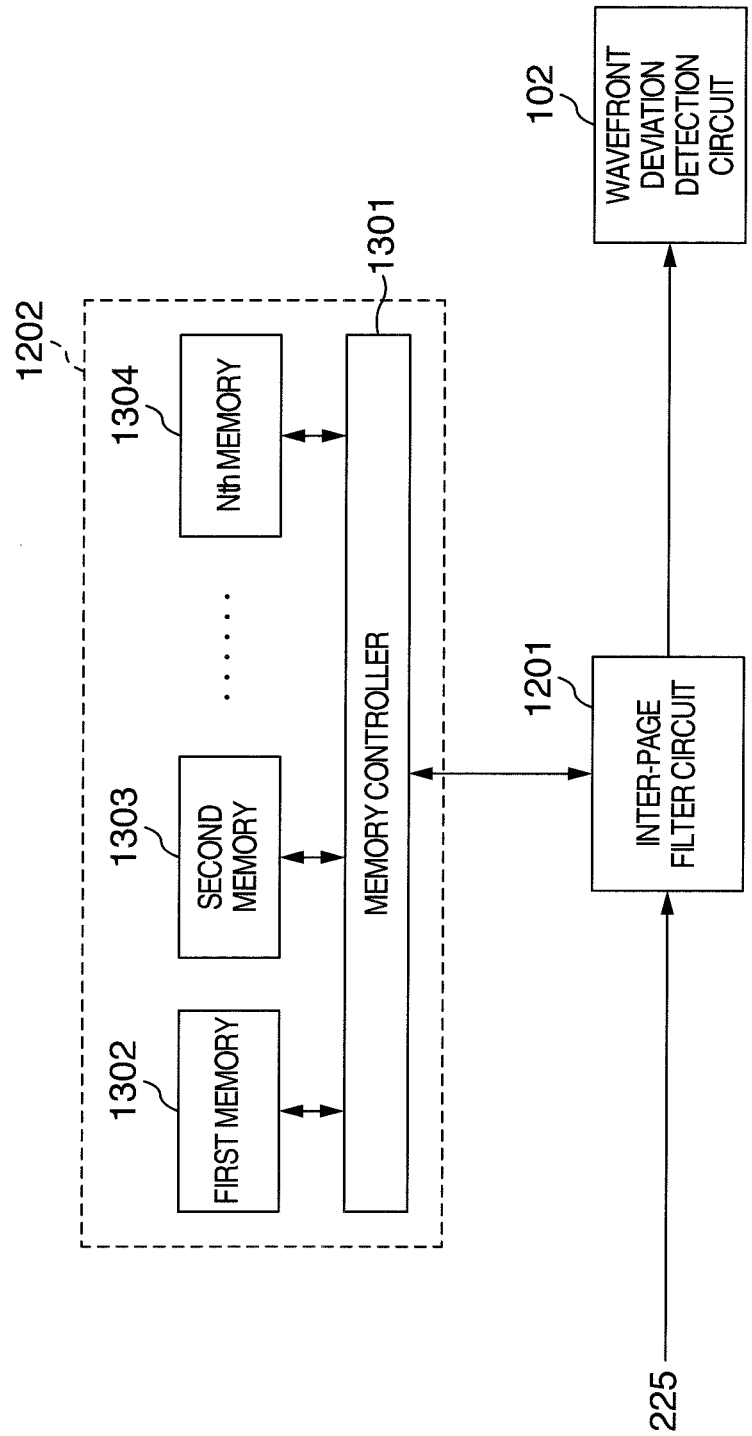
FIG. 13 is a schematic block diagram of one example of memory circuit configuration.

Detection of wavefront deviations and compensation procedure of the present embodiment are described by referring to FIGS. 12 and 13.

The configuration of the wavefront compensation circuit is shown in FIG. 12. First, phase information computed from the output from the light detector 225 is entered into an inter-page filter circuit 1201, which in turn enters the input phase information into a memory controller 1301 of a memory 1202. The memory controller 1301 stores the phase information from a first memory 1302 to an Nth memory 1304 in turn in the order of pages to be processed. The stored phase information is replaced from the oldest page by newer page information. The memory controller 1301 passes all or some of the phase information, contained from the first memory 1302 to the Nth memory 1304, to the inter-page filter circuit 1201. The inter-page filter circuit 1201 then averages out the phase information for the pixels located at the same position throughout the plurality of pages entered from the memory controller 1301, calculates interference fringes arising from wavefront deviations (FIG. 10, (a)), and enters the interference fringes into the wavefront deviation detection circuit 102. The following operations are the same as the corresponding operations of Embodiment 1.

The phase information stored in from the first memory 1302 to the Nth memory 1304 is preferably initialized every book. If the state of wavefront deviation between the oscillator light 230 and the diffracted light 231 does not vary in a different book, the processing may be made to proceed without initialization.

In the present embodiment, although the averaging technique is implemented by storing sets of phase information about the plurality of pages in different memories, it is not restricted to this method. Any other method can also be used as long as the sets of phase information about the plurality of pages can be averaged, e.g., phase information about a new page is added to the phase information about the previous information and similar additions continue to be done. Additionally, an amount of compensation calculated from some book may be used for other books.

The configuration described so far permits the holographic recording/reproducing optical system to compensate the wavefront deviation between the oscillator light and the diffracted light. Hence, the reproducing performance can be improved. Furthermore, wavefront deviations that are filtered out by the low-pass filter of Embodiment 1 can be accurately compensated for.

Embodiment 3

The present embodiment is similar to Embodiment 1 except for the detection of wavefront deviation and compensation procedure.

To detect wavefront deviations precisely, it is directed to make adjustments using a white page having the same brightness and/or the same phase over the whole page.

Figure 14:
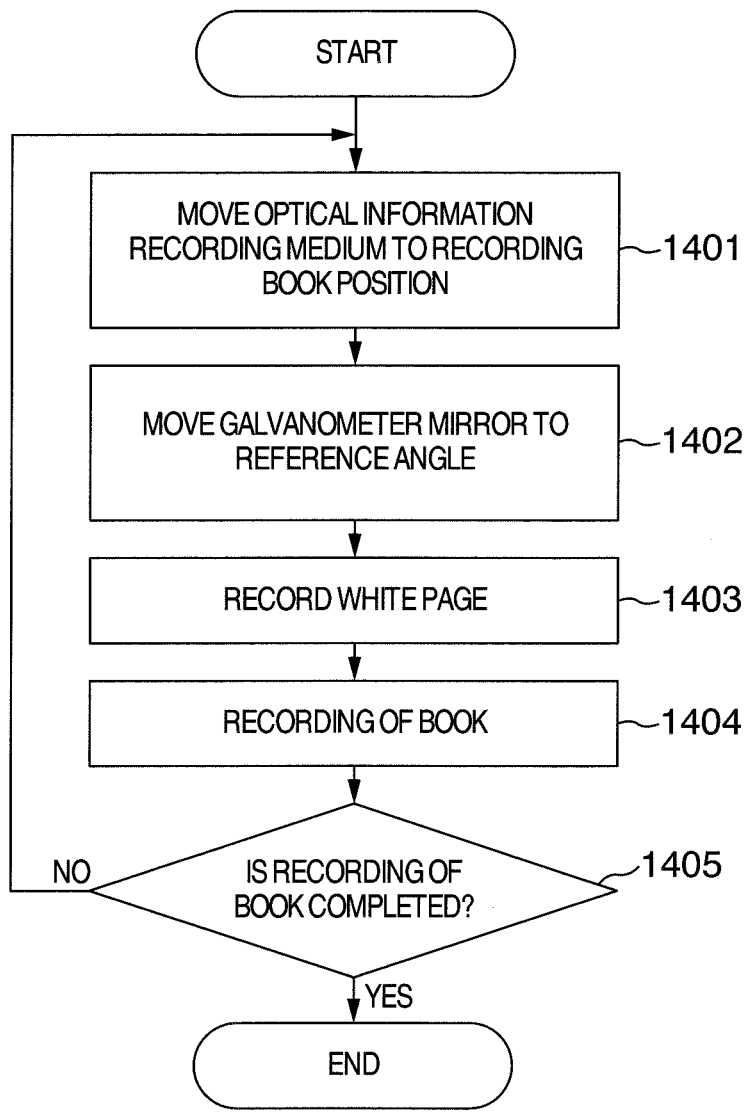
FIG. 14 is a flowchart illustrating a sequence of operations performed by the optical pickup during a recording operation.
Figure 15:
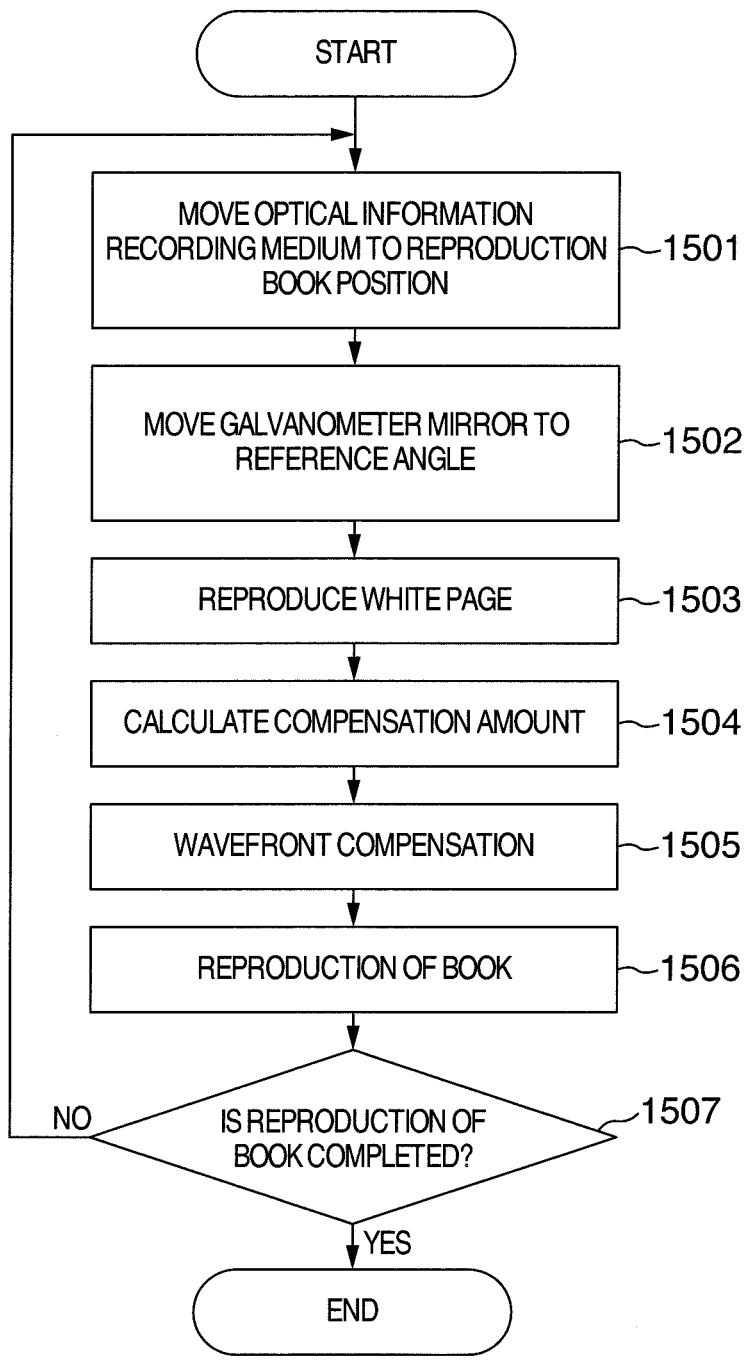
FIG. 15 is a flowchart illustrating a sequence of operations performed by the pickup during a reproducing operation.

Detection of wavefront deviations and the compensation procedure of the present embodiment are described by referring to FIGS. 14 and 15.

FIG. 14 is a flowchart showing a sequence of operations performed during recording. The optical information recording/reproducing medium 1 is moved into a position to be recorded (1401). The galvanometer mirror is moved to the reference angle (1402), the white page is recorded (1403), and subsequently, pages are recorded in turn ordinarily (1404). These steps from (1401) to (1404) are repeated until the recording is completed (1405). The white page is recorded in each book by the procedure described so far.

FIG. 15 is a flowchart showing a sequence of operations performed during reproduction. The optical information recording/reproducing medium 1 is moved into a position to be reproduced (1501). The galvanometer mirror is moved to the reference angle (1502), the white page is reproduced (1503), and the amounts of compensation that cancel out wavefront deviations are calculated by the wavefront deviation detection circuit 102 and compensation amount calculation circuit 103 by the same procedure as in Embodiment 1 (1504). The wavefront deviation between the oscillator light and the diffracted light is compensated by controlling the spatial light modulator 228 or the wavefront control device based on the amounts of compensation (1505). Then, the recorded pages are reproduced in turn (1506). These steps from (1501) to (1506) are repeated until the reproduction is completed (1507).

In the examples described so far, the white page is recorded in each book. However, the white page is not always needed for each book, and may be recorded in every plurality of books. Where the amount of wavefront deviation between the oscillator light and the diffracted light varies due to angular variations of the reference light, a plurality of white pages may be recorded in each book. During reproduction, it is not necessary that adjustments are made in all the white pages, and adjustments may be made in every plurality of books or only when a disc is inserted.

In the description of the above example, although a page that is totally uniform in brightness is taken as one example of the white page, not the whole page but a part of the page may be uniform.

The procedure described so far makes it possible to compensate the wavefront deviation between the oscillator light and the diffracted light by the holographic recording/reproducing optical system, so that the reproducing performance can be improved. Further, the wavefront deviations that are filtered out by the low-pass filter of Embodiment 1 can be accurately compensated.

Embodiment 4

The present embodiment is similar to Embodiment 1 except for the method of generating the oscillator light.

Figure 16:
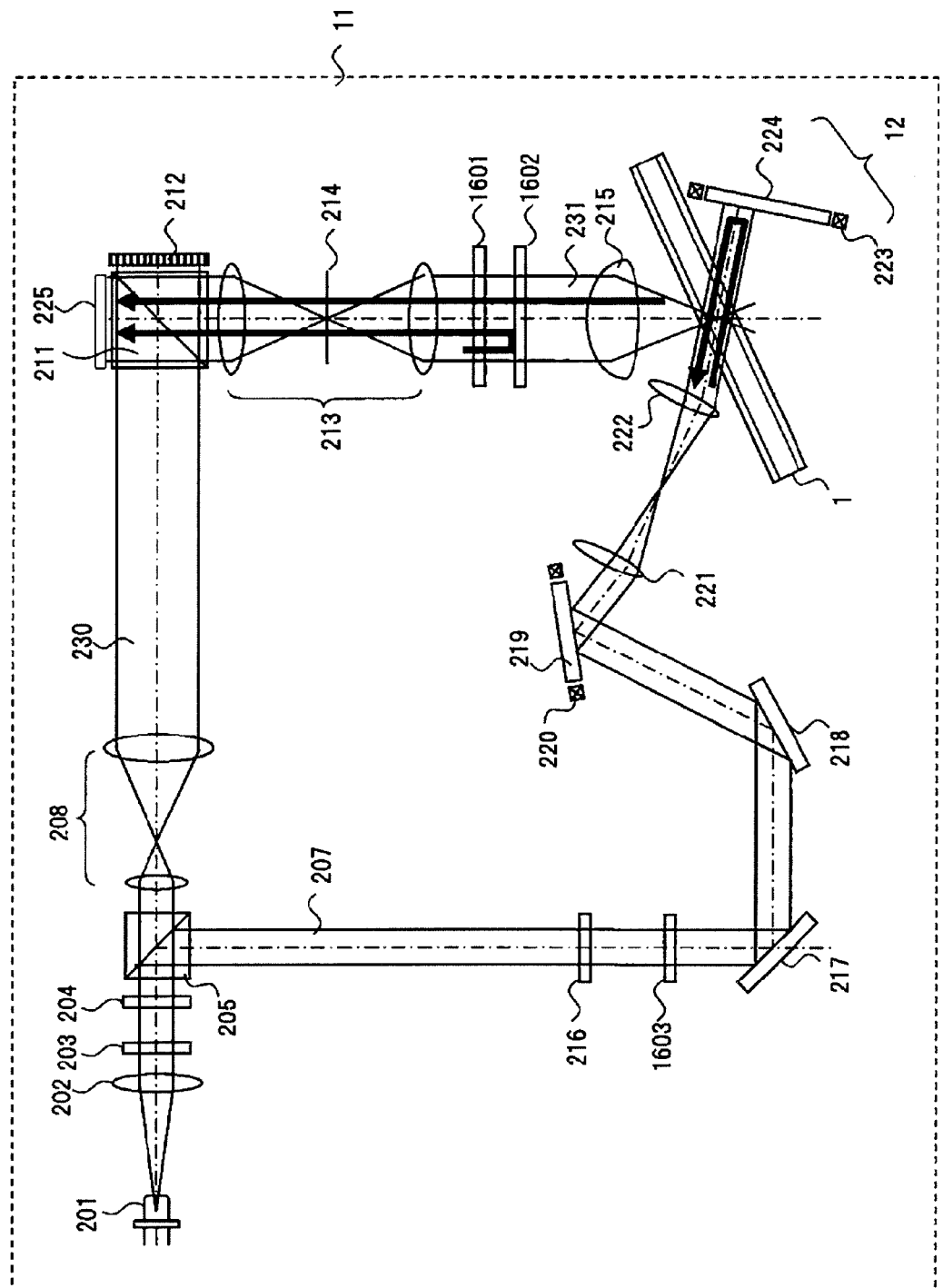
FIG. 16 is a schematic optical ray diagram of an optical pickup included within an optical information recording/reproducing apparatus.
Figure 17:
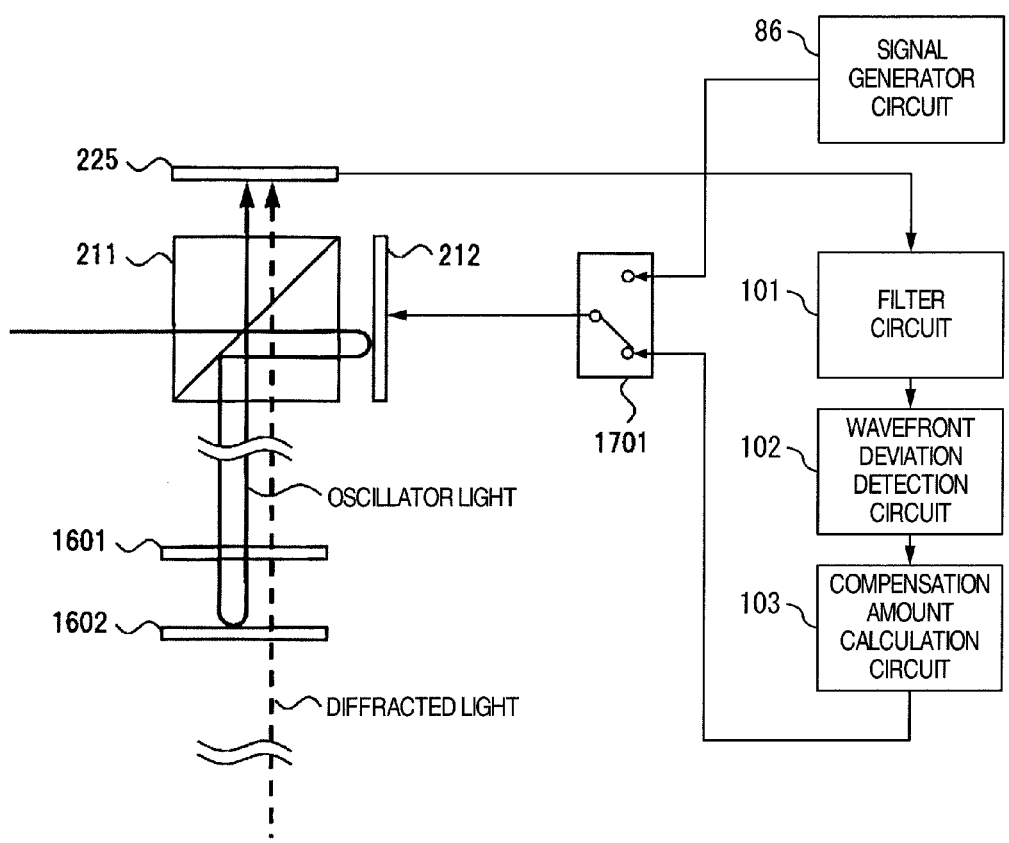
FIG. 17 is a schematic block diagram of one example of a system for achieving wavefront deviation detection and compensation control.

The detection of wavefront deviations and the compensation procedure of the present embodiment are described by referring to FIGS. 16 and 17.

FIG. 16 shows the configuration of an optical pickup 11 that is similar to the optical pickup of Embodiment 1 except that the spatial light modulator 228 for the oscillator light acts also as the spatial light modulator 212. FIG. 17 shows the path of the optical beam of FIG. 16, in which the arrows in the figure do not indicate the optical axis of a beam but merely indicate the order of passing the elements.

In order to generate the oscillator light 230 that will interfere with the diffracted light 231 in the light detector 225, the direction of polarization is controlled by the polarization direction converter device 204, and a desired amount of light passes through the polarizing beam splitter 205. The oscillator light 230 transmitted through the polarizing light beam splitter 205 is increased in beam diameter by the beam expander 208. Then, the light passes through the polarizing light beam splitter 211 and enters the spatial light modulator 212. In the spatial light modulator 212, at least four phases including a given reference phase and three phases that are different from the reference phase by 90 degrees, 180 degrees, and 270 degrees, respectively, are added to the oscillator light 230. For this purpose, the pixels of the spatial light modulator 212 need to be arranged such that each pixel of one page of data is over-sampled using at least four pixels during recording. Consequently, in the present embodiment, one pixel may be advantageously displayed every four pixels during recording. The oscillator light 230 to which the phases are added is reflected by the polarizing beam splitter 211, passes through the relay lens 213, is circularly polarized by a quarter-wave plate 1601, and enters a half mirror 1602. The oscillator light 230 reflected by the half mirror 1602 is linearly polarized by the quarter-wave plate 1601, passes through the polarizing beam splitter 211, and enters the light detector 225.

On the other hand, the diffracted light 231 circularly polarized and reproduced by the quarter-wave plate 1603 placed in the optical path of the reference light 207 passes through the objective lens 215 and the half mirror 1602. The light is then linearly polarized by the quarter-wave plate 1601, passes through the polarizing beam splitter 211, and enters the light detector 225.

Then, as shown in FIG. 17, phase information calculated from the output from the light detector 225 is entered into the filter circuit 101. Amounts of compensation are calculated through the wavefront deviation detection circuit 102 and the compensation amount calculation circuit 103. The output from a selector 1701 operates such that the output from the compensation amount calculation circuit 103 is selected during reproduction and the output from the signal generator circuit 86 is selected during recording. During reproduction, the spatial light modulator 212 adds the at least four phases including the given reference phase and the other phases different from the reference phase to the oscillator light 230. The spatial light modulator 212 is controlled such that the reference phase is the amount of compensation delivered from the selector 1701.

In the examples given so far, the quarter-wave plate 1601 and half mirror 1602 are positioned between the objective lens 215 and relay lens 213. However, they may also be placed anywhere such as between the relay lens 213 and the polarizing beam splitter 211 as long as the oscillator light 230 is passed into the light detector 225 via the spatial light modulator 212. Furthermore, in the above description, the half mirror 1602 is used. However, any device may be used as long as it reflects the oscillator light and transmits the diffracted light such as a photonic crystal device that controls transmission and reflection according to the polarization of light.

The configuration described so far makes it possible to compensate the wavefront deviation between the oscillator light and the diffracted light in the holographic recording/reproducing optical system, so that the reproducing performance can be improved. In addition, the spatial light modulator for signal light and the spatial light modulator for oscillator light are commonly used, so that the cost can be suppressed.

It is to be understood that the present invention is not restricted to the above-described embodiments and that the invention embraces various modifications. For example, the above embodiments have been described in detail to describe the present invention in an easily understandable way. The invention is not restricted to one having all of the above-described configurations. Furthermore, some configurations of one embodiment may be replaced by configurations of other embodiment. In addition, configurations of other embodiment may be added to configurations of one embodiment. Further, regarding some configurations of each embodiment, other configurations may be added, deleted, or replaced.

Furthermore, the aforementioned configurations, functions, processing portions, and processing means may be totally or partially realized in hardware, for example, by designing them using an integrated circuit. Furthermore, the above-described configurations, functions, and so on may be realized in software, for example, by making a processor to interpret a program that realizes the functions and to perform the functions. Information about program, table, files, and so on for implementing the functions can be placed in a memory, hard disc, SSD (solid state drive), or other storage device, IC card, SD card, DVD, or other recording medium.

Those control lines and information lines that are considered to be necessary for explanation are shown, and not all the control lines and information lines in a final product are shown. In practice, it may be considered that almost all the configurations are interconnected.

The invention claimed is:

1. An optical information recording/reproducing apparatus for recording and reproducing information in and from an optical recording medium using light, the optical information recording/reproducing apparatus comprising:
  an oscillator light generator which generates oscillator light that is made to overlap and interfere with reproduced light from the optical recording medium;
  an oscillator light modulator which adds a predetermined phase difference between the oscillator light and the reproduced light;
  a light detector which detects interference light in which the oscillator light and the reproduced light overlap each other;
  a wavefront deviation detector which detects an amount of wavefront deviation between the oscillator light and the reproduced light from an output of the light detector; and
  a compensation amount calculation unit which calculates a wavefront compensation amount from the amount of wavefront deviation;
  wherein the phase difference added at the oscillator light modulator is controlled based on the wavefront compensation amount; and
  the wavefront deviation detector detects the amount of wavefront deviation for an output from the light detector based on a signal passed through a low-pass filter that is designed to pass frequencies of interference fringes of the interference light.

2. An optical information recording/reproducing apparatus for recording and reproducing information in and from an optical recording medium using light, the optical information recording/reproducing apparatus comprising:
  an oscillator light generator which generates oscillator light that is made to overlap and interfere with reproduced light from the optical recording medium;
  an oscillator light modulator which adds a predetermined phase difference between the oscillator light and the reproduced light;
  a light detector which detects interference light in which the oscillator light and the reproduced light overlap each other;
  a wavefront deviation detector which detects an amount of wavefront deviation between the oscillator light and the reproduced light from an output of the light detector; and a compensation amount calculation unit which calculates a wavefront compensation amount from the amount of wavefront deviation;

wherein the phase difference added at the oscillator light modulator is controlled based on the wavefront compensation amount; and the wavefront deviation detector detects the amount of wavefront deviation for an output from the light detector responsive to a plurality of page data based on a smoothed signal.

3. The optical information recording/reproducing apparatus of claim 1, further comprising a signal light modulator which adds information to signal light, wherein information is recorded by making the signal light delivered from the signal light modulator and reference light to interfere with each other and recording resulting interference fringes as a hologram in the optical recording medium, and information is reproduced by reproducing the recorded optical recording medium.

4. The optical information recording/reproducing apparatus of claim 3, wherein during recording, a reference page that is totally or partially uniform in brightness and/or phase is recorded, wherein during reproduction, the amount of wavefront compensation for the reference page is calculated, and wherein a phase difference added by the oscillator light modulator is controlled based on the amount of wavefront compensation for the reference page.

5. The optical information recording/reproducing apparatus of claim 3, wherein the oscillator light modulator is used also as the signal light modulator.

6. A method of optically recording and/or reproducing information in and from an optical recording medium, the method comprising:

generating oscillator light that will be made to overlap and interfere with reproduced light emanating from the optical recording medium;

modulating the oscillator light in which a predetermined phase difference is added between the oscillator light and the reproduced light;

detecting interference light in which the oscillator light and the reproduced light overlap each other;

detecting an amount of wavefront deviation between the oscillator light and the reproduced light from the detected interference light; and calculating an amount of wavefront compensation from the amount of wavefront deviation; and controlling a phase difference to add based on the amount of wavefront compensation;

wherein the detecting an amount of wavefront deviation detects the amount of wavefront deviation for an output from the detecting interference light based on a signal passed through a low-pass filter that is designed to pass frequencies of interference fringes of the interference light.

7. A method of optically recording and/or reproducing information in and from an optical recording medium, the method comprising:

generating oscillator light that will be made to overlap and interfere with reproduced light emanating from the optical recording medium;

modulating the oscillator light in which a predetermined phase difference is added between the oscillator light and the reproduced light;

detecting interference light in which the oscillator light and the reproduced light overlap each other;

detecting an amount of wavefront deviation between the oscillator light and the reproduced light from the detected interference light; and calculating an amount of wavefront compensation from the amount of wavefront deviation; and controlling a phase difference to add based on the amount of wavefront compensation;

wherein during the detecting the amount of wavefront deviation, the amount of wavefront deviation is detected for the plurality of page data based on a smoothed signal.

8. A method of optically recording and/or reproducing information as set forth in claim 6, further comprising modulating the signal light in which information is added to the signal light, wherein information is recorded by making the signal light as a result of the signal light modulation and the reference light to interfere with each other and recording resulting interference fringes as a hologram in the optical recording medium, and information is reproduced by reproducing the recorded optical recording medium.

9. A method of optically recording and/or reproducing information as set forth in claim 8, wherein during recording, a reference page that is totally or partially uniform in brightness and/or phase is recorded, wherein during reproduction, the amount of wavefront compensation for the reference page is calculated, and wherein the phase difference added in the modulating the oscillator light is controlled based on the amount of wavefront compensation for the reference page.

10. An optical information reproducing apparatus for optically reproducing information from an optical recording medium, the optical information reproducing apparatus comprising:

an oscillator light generator which generates oscillator light that is made to overlap and interfere with reproduced light from the optical recording medium;

an oscillator light modulator which adds a predetermined phase difference between the oscillator light and the reproduced light;

a light detector which detects interference light in which the oscillator light and the reproduced light overlap each other;

a wavefront deviation detector which detects an amount of wavefront deviation between the oscillator light and the reproduced light from an output of the light detector; and a compensation amount calculation portion which calculates an amount of wavefront compensation from the amount of wavefront deviation;

wherein the phase difference added at the oscillator light modulator is controlled based on the amount of wavefront compensation; and the wavefront deviation detector detects the amount of wavefront deviation for an output from the light detector based on a signal passed through a low-pass filter that is designed to pass frequencies of interference fringes of the interference light.

11. An optical information reproducing apparatus for optically reproducing information from an optical recording medium, the optical information reproducing apparatus comprising:

an oscillator light generator which generates oscillator light that is made to overlap and interfere with reproduced light from the optical recording medium;

an oscillator light modulator which adds a predetermined phase difference between the oscillator light and the reproduced light;

a light detector which detects interference light in which the oscillator light and the reproduced light overlap each other;

a wavefront deviation detector which detects an amount of wavefront deviation between the oscillator light and the reproduced light from an output of the light detector; and a compensation amount calculation portion which calculates an amount of wavefront compensation from the amount of wavefront deviation;

wherein the phase difference added at the oscillator light modulator is controlled based on the amount of wavefront compensation; and the wavefront deviation detector detects the amount of wavefront deviation for a plurality of page data based on a smoothed signal.

12. The optical information reproducing apparatus of claim 10, wherein information is reproduced by making the reference light and the signal light to interfere with each other and reproducing the optical recording medium in which resulting interference fringes are recorded as a hologram.

13. The optical information reproducing apparatus of claim 12, wherein a part of the hologram is recorded with a reference page that is totally or partially uniform in brightness and/or phase, wherein amount of wavefront compensation for the reference page is calculated, and wherein the phase difference added at the oscillator light modulator is controlled based on the amount of wavefront compensation of the reference page.

* * * * *